Patented Nov. 18, 1930

1,782,140

UNITED STATES PATENT OFFICE

HARRY L. FISHER AND HERBERT A. WINKELMANN, OF AKRON, OHIO, ASSIGNORS TO THE B. F. GOODRICH COMPANY, OF NEW YORK, N. Y., A CORPORATION OF NEW YORK

RUBBER DERIVATIVE AND METHOD OF MAKING SAME

No Drawing. Application filed December 29, 1926. Serial No. 157,867.

This invention relates to methods of producing heat-plastic derivatives of rubber by treating rubber with certain reagents capable of reacting therewith, and to the products of such reaction.

An object of this invention is to provide derivatives of rubber having changed physical and chemical properties, particularly a higher degree of heat plasticity and a less chemical unsaturation than the rubber from which the derivatives are made, and further to provide a process of manufacture which shall economically produce these derivatives of rubber.

This invention is based on the discovery that the dialkyl sulfates are capable of reacting with rubber, when intimate mixtures thereof are heated to moderately high temperatures, to produce materials which are heat-plastic at relatively low temperatures and which, when purified, have a less chemical unsaturation than rubber.

In general, these heat plastic rubber derivatives may be prepared by thoroughly masticating a mass of crude rubber, for example on a rubber mill, and adding the reagent directly to the rubber during the working on the mill. Certain of the dialkyl sulfates are more or less toxic and direct addition thereof to rubber on the mill is consequently difficult of accomplishment. Such reagents may however be added to rubber in solution and the solvent distilled off, leaving the reagent dispersed in the mass of rubber. When the reagent has been thoroughly dispersed throughout the rubber, the mixture is heated in any suitable manner, as in open heat in an oven. Preferably the heating should be maintained throughout the exothermal reaction and may or may not be continued after it has subsided. The product is then cooled, either before or after removal from the oven, and is preferably reworked for industiral use, either by mastication, by comminution, by solution or by other suitable means for homogenizing the product, without substantially changing its chemical characteristics.

The following examples are given by way of illustration of preferred embodiments of the process of this application.

*Example 1.*—A rubber cement consisting of 7.3 parts by weight of rubber and 92.7 parts of benzene is placed in a suitable receptacle on a steam bath and 7.3 parts of dimethyl sulfate added thereto with stirring. The admixture is heated for several hours, the resulting product being a dark colored limpid liquid. The solvent is driven off from the liquid reaction mixture, as by distillation, leaving a mass of rubber through which the dimethyl sulfate is dispersed, and this solid residue is placed in an oven and heated for 21 hours at 125° C. The reaction product is a dark, almost black, hard, tough product.

*Example 2.*—As an example of the preparation of a heat-plastic product by the use of a dialkyl sulfate, take 10 parts by weight of diethyl sulfate and intimately disperse it through 100 parts by weight of crude rubber, preferably by milling the reagents into the rubber, as on a rubber mill, and subject the mass to heat at 140° C. for 8 hours. A strong exothermal reaction takes place in from one to two hours, gases being given off. The resulting product is a tough, heat-plastic material having a relatively low softening temperature. It is dark in color and is readily remoldable into any desired shape when heated. It dissolves in the well-known rubber solvents, such as benzene, gasoline, carbon tetrachloride, carbon disulfide, etc., but is practically insoluble in alcohol, ether, water, dilute acids and alkalies. It is relatively stable under atmospheric conditions.

*Example 3.*—A somewhat different product in appearance but one otherwise having very similar physical and chemical properties is prepared by mixing 20 parts of diethyl sulfate into 100 parts of crude rubber and subjecting the mass to heat for 8 hours at 140° C. The reaction is strongly exothermal, as in the preceding example, and the resulting product, when cooled, is harder and has a somewhat higher softening temperature than the above described product of Example 2.

It is to be understood that numerous variations and modifications of the specific procedure set forth above may be made without departing from the principles of the invention herein set forth.

We claim:

1. The method of producing heat-plastic rubber derivatives which comprises incorporating into rubber a dialkyl sulfate, and heating the mix under conditions causing it to be changed to a thermoplastic product.

2. The method of producing a heat-plastic rubber derivative which comprises incorporating into rubber a dialkyl sulfate and applying heat to the mix sufficiently to cause an exothermal temperature rise therein.

3. The method of producing a heat-plastic rubber derivative which comprises mixing into rubber diethyl sulfate, and effecting an exothermal reaction between the rubber and the diethyl sulfate to the extent of converting the mass into a thermoplastic product.

4. A composition of matter comprising the heat-plastic reaction product of rubber and a dialkyl sulfate.

5. A composition of matter comprising the heat-plastic reaction product of rubber and diethyl sulfate.

6. The method of producing heat-plastic rubber derivatives which comprises reacting rubber with a dialkyl sulfate under the influence of heat.

In witness whereof we have hereunto set our hands.

HARRY L. FISHER.
HERBERT A. WINKELMANN.